(12) United States Patent
Throckmorton et al.

(10) Patent No.: US 6,173,097 B1
(45) Date of Patent: Jan. 9, 2001

(54) FIELD INSTALLABLE MULTIFIBER CONNECTOR

(75) Inventors: Rodney A. Throckmorton, Newton; Mark W. Spriggle, Hickory, both of NC (US); Jeffrey D. Palmer, Fort Worth, TX (US)

(73) Assignee: Siecor Operations, LLC, Hickory, NC (US)

( * ) Notice: Under 35 U.S.C. 154(b), the term of this patent shall be extended for 0 days.

(21) Appl. No.: 09/108,451

(22) Filed: Jul. 1, 1998

(51) Int. Cl.$^7$ .................................................. G02B 6/38
(52) U.S. Cl. .............................. 385/59; 385/56; 385/62; 385/71
(58) Field of Search ................................. 385/53, 55, 56, 385/59, 60, 62, 66, 70, 71, 72

(56) References Cited

U.S. PATENT DOCUMENTS

| | | |
|---|---|---|
| 3,644,874 | 2/1972 | Hutter . |
| 3,781,762 | 12/1973 | Quackenbush . |
| 4,135,776 | 1/1979 | Ailawadhi et al. . |
| 4,414,697 | 11/1983 | Hartley . |
| 4,684,201 | 8/1987 | Hutter . |
| 4,822,131 | * 4/1989 | Anderton ................. 385/58 |
| 4,898,449 | 2/1990 | Vroomen et al. . |
| 4,964,688 | * 10/1990 | Caldwell et al. ............ 385/56 |
| 5,040,867 | 8/1991 | de Jong et al. . |
| 5,064,268 | 11/1991 | Morency et al. . |
| 5,093,881 | 3/1992 | Bortolin et al. . |
| 5,123,072 | 6/1992 | Kawanami et al. . |
| 5,125,055 | 6/1992 | Kawanami et al. . |
| 5,141,451 | 8/1992 | Down . |
| 5,274,903 | 1/1994 | Grois et al. . |
| 5,338,225 | 8/1994 | Jacobsen et al. . |
| 5,400,426 | 3/1995 | de Jong et al. .............. 385/95 |
| 5,499,934 | 3/1996 | Jacobsen et al. . |
| 5,748,819 | 5/1998 | Szentesi et al. . |

* cited by examiner

Primary Examiner—Darren Schuberg

(57) ABSTRACT

A multifiber connector is provided according to one embodiment which includes a multifiber ferrule, splice components and a crimp tube that defines a lengthwise extending passageway having a lateral cross-sectional shape that is generally oval for receiving and maintaining a plurality of optical fibers in a lateral side-by-side relationship. The crimp tube therefore provides the optical fibers to the splice components in an aligned and properly spaced manner for alignment and optical interconnection with respective optical fiber stubs. According to another embodiment, a fiber optic connector is provided that includes a ferrule, mechanical splice components, an associated cam member for actuating the mechanical splice components and means for controlling the position of the cam member relative to the mechanical splice components such that the cam member can be precisely moved from a first unactuated position to a second actuated position. As such, the fiber optic connector can be mechanically spliced to a plurality of optical fibers in a reliable manner so as to facilitate the field installation of a multifiber connector. the multifiber connector can also include a ferrule holder for aligning the ferrule and the splice components.

10 Claims, 5 Drawing Sheets

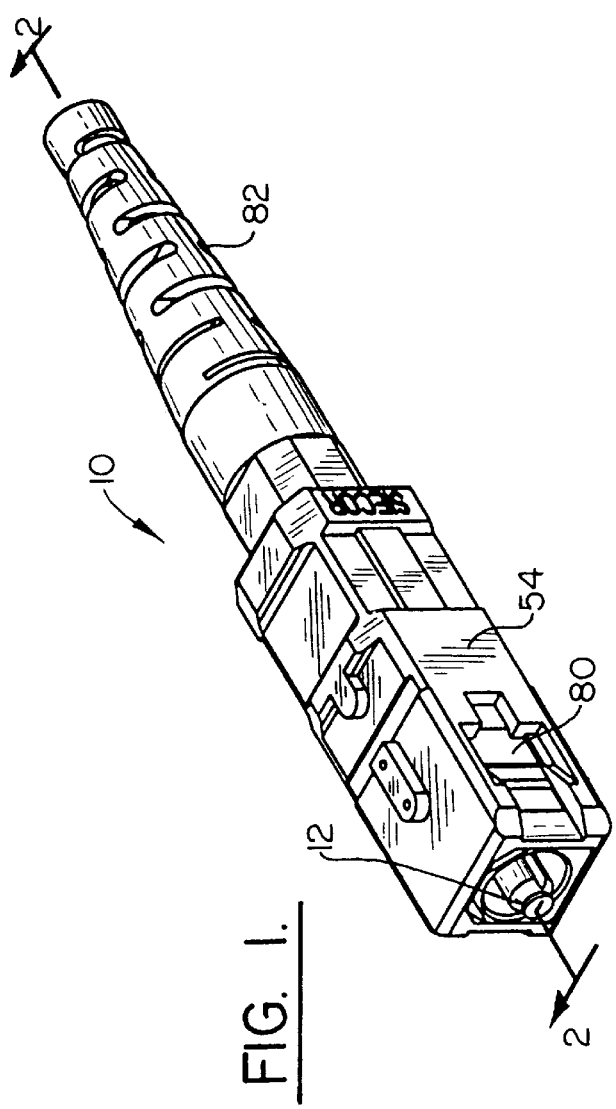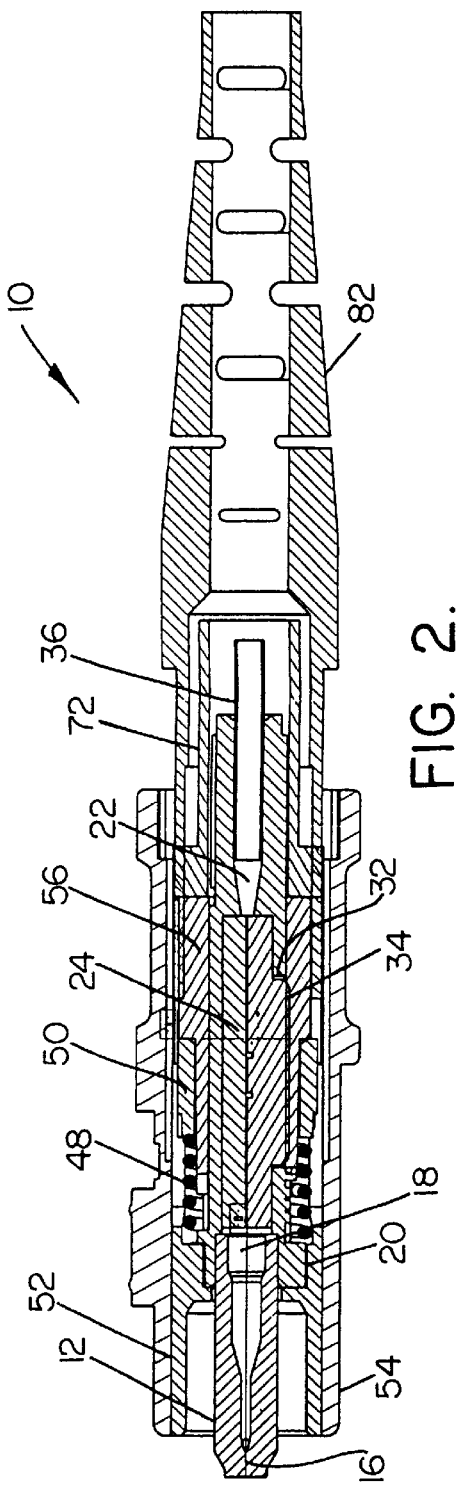

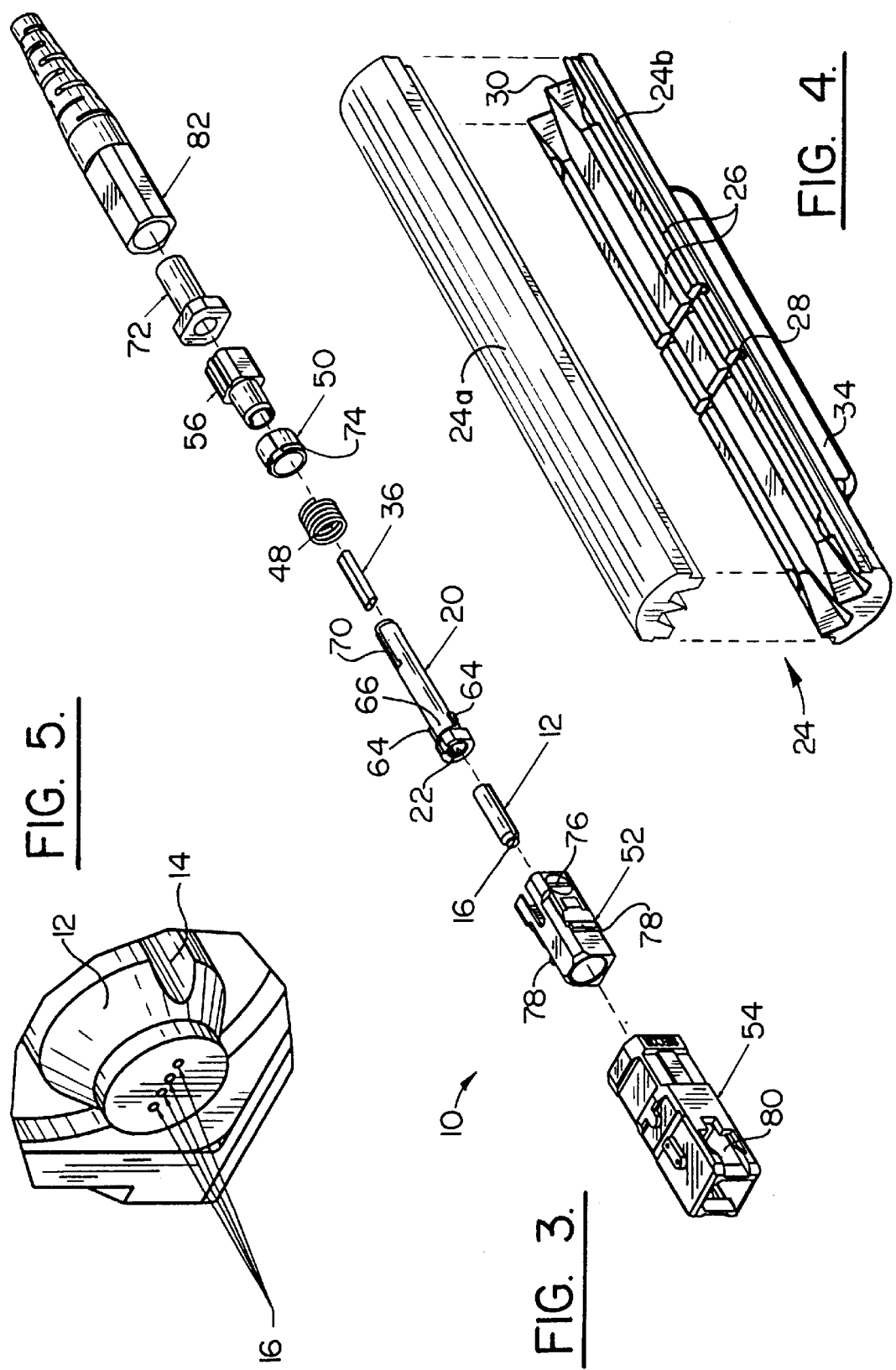

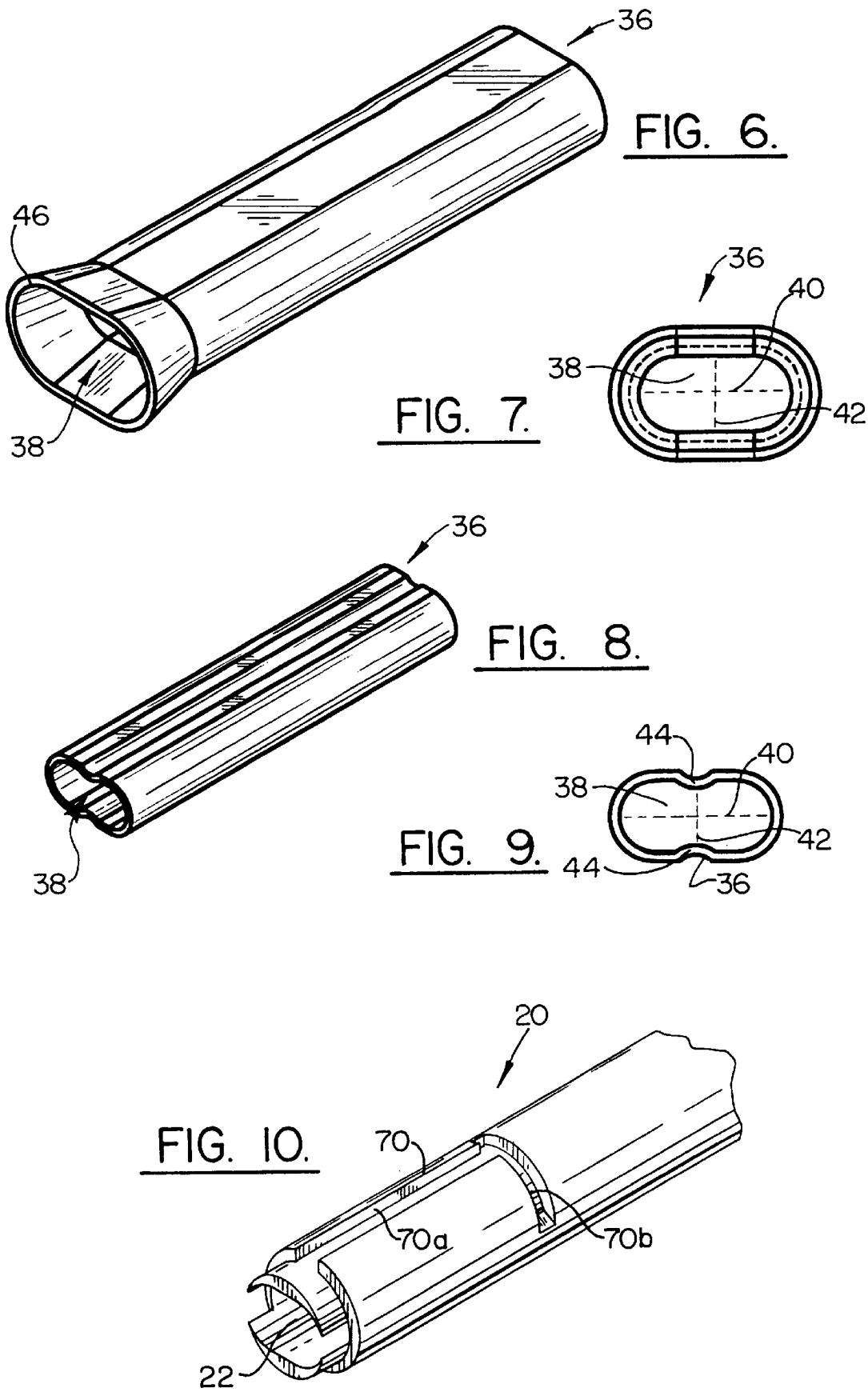

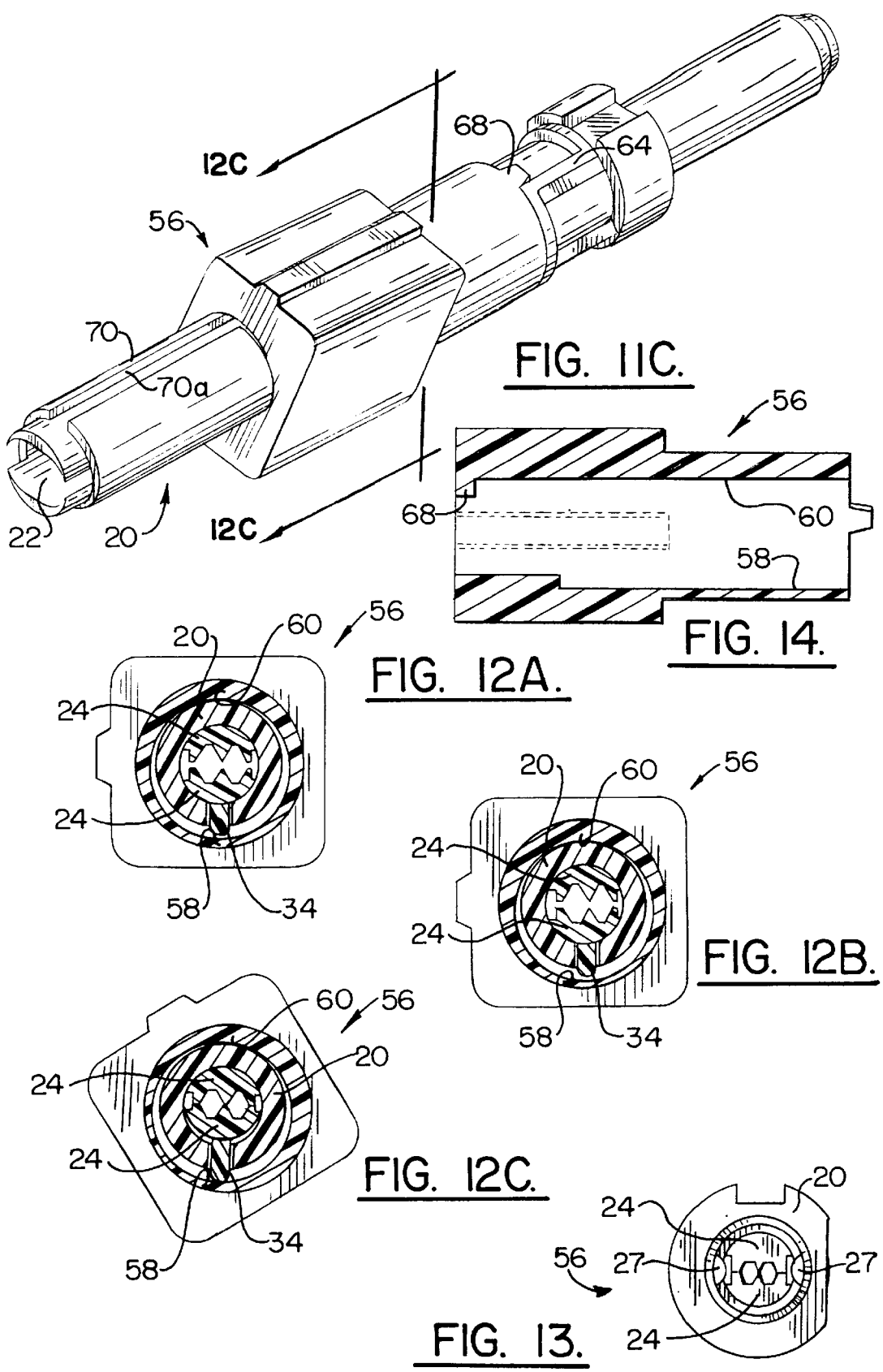

FIELD INSTALLABLE MULTIFIBER CONNECTOR

FIELD OF THE INVENTION

The present invention relates generally to fiber optic connectors and, more particularly, to multifiber fiber optic connectors adapted for field installation.

BACKGROUND OF THE INVENTION

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals or pedestals, are required. However, in order to efficiently couple the signals transmitted by the respective optical fibers, a fiber optic connector must not significantly attenuate or alter the transmitted signals. In addition, the fiber optic connector must be relatively rugged and adapted to be connected and disconnected a number of times in order to accommodate changes in the optical fiber transmission path.

In order to provide the desired signal transmission characteristics, a number of fiber optic connectors have been developed which are mounted to the end portion of one or more optical fibers during a factory assembly process. By mounting the fiber optic connector to the optical fiber(s) and/or fiber optic cable (hereinafter optical fiber) during an assembly process at the factory, the assembly of the fiber optic connector can be standardized such that inconsistent assembly and other problems associated with the field installation of the connector are avoided.

However, the factory installation of fiber optic connectors is not altogether satisfactory for every application. In particular, the factory installation of fiber optic connectors does not customize the installation process to account for the myriad of design variations experienced in the field. For example, by installing fiber optic connectors to the end portion of an optical fiber at the factory, the length of the connectorized optical fiber is fixed, thus requiring excess length and coiling to insure sufficient length for all applications. In addition, in many instances, it is desirable to cut a length of optical fiber into a plurality of shorter lengths of optical fiber, each of which must be individually connected, such as by a fiber optic connector, to another optical fiber or to a patch panel or other type of terminal. However, the respective lengths of the shorter optical fibers cannot generally be determined until the optical fibers are installed in the field. Thus, in this instance, the requisite fiber optic connectors cannot be mounted to the fibers at the factory prior to installation of the optical fiber. Still further, it is desirable, in many instances, to package and ship optical fiber prior to the installation of the fiber optic connectors since the fiber optic connectors generally have a greater diameter than the respective optical fiber, and may unnecessarily complicate the packaging and shipping of the optical fiber.

Consequently, several fiber optic connectors have been developed which can be mounted to the end portion of an optical fiber in the field once the particular application of the optical fiber has been determined. For example, the UNI-CAM™ connector which is manufactured and distributed by Siecor Corporation, the assignee of the present invention, is adapted to be mechanically spliced to an optical fiber.

Unfortunately, the UNICAM™ connector as well as most other standard field installable connectors are designed to be mounted upon the end portion of a single optical fiber. Accordingly, in order to connectorize two or more optical fibers, such as provided by a fiber optic ribbon cable or the like, the optical fibers must be separated and then individually terminated with single fiber connectors. As will be apparent, the individual connectorization of a plurality of optical fibers therefore requires significant time, labor and cost. Additionally, the separation of a fiber optic cable into individual optical fibers also mechanically weakens the fiber optic cable at the point of separation.

In order to connectorize two or more optical fibers with a single connection, a number of multifiber connectors have been developed which receive and maintain two or more optical fibers in respective predetermined positions during interconnection. For example, the ESCON™ connector and the FCS™ connector have been developed. These connectors include a pair of conventional ferrules, each of which receive and maintain a single optical fiber in a predetermined position during interconnection. The ESCON™ and FCS™ connectors also include a housing or yoke which surrounds and supports the ferrules in a side-by-side relationship. Accordingly, these fiber optic connectors can provide for the simultaneous connection of two or more optical fibers as known to those skilled in the art. However, these fiber optic connectors, such as the ESCON™ and FCS™ connectors, have a nonstandard size and are generally relatively large since they include at least two conventional ferrules positioned in a side-by-side relationship. See also U.S. Pat. Nos. 4,898,449 to Vroomen, et al.; 5,064,268 to Morency, et al.; 5,093,881 to Bartolin, et al., 5,123,072 to Kawanami, et al.; and 5,125,055 to Kawanami, et al. which describe several other types of customized or nonstandard multifiber connectors.

Therefore, while a number of customized or nonstandard multifiber connectors have been developed, these multifiber connectors typically include multiple components, such as multiple ferrules, which must be assembled to form the fiber optic connector. Due to the multiple components which must generally be precisely aligned, the assembly process can be relatively complicated and the resulting cost of the non-standard fiber optic connectors can be correspondingly increased. For example, the end face of most nonstandard multifiber connectors must be precisely polished since those multifiber connectors are typically quite sensitive to polishing imperfections which may result in poor optical performance or failure of the multifiber connector. As a result, specially trained technicians may be required to mount these multifiber connectors to the end portions of two or more optical fibers. In addition, due to the customized or non-standard designs of these fiber optic connectors, the fiber optic connectors typically cannot mate with standard fiber optic connectors or with terminals which have been designed to mate with standard fiber optic connectors. As such, other connector hardware must be provided to permit these nonstandard multifiber connectors to mate with a connector sleeve, a terminal or the like. Further, the relatively large size of a number of the nonstandard fiber optic connectors described above limits the applications in which such fiber optic connectors can be employed since they may be unable to mate with other fiber optic connectors or other types of terminals in areas of limited access.

SUMMARY OF THE INVENTION

According to one advantageous aspect of the present invention, a multifiber connector is provided which includes a multifiber ferrule, splice components and a crimp tube that defines a lengthwise extending passageway having a lateral cross-sectional shape which is generally oval for receiving a plurality of optical fibers and that is adapted to be crimped about the optical fibers so as to maintain the optical fibers in a lateral side-by-side relationship. As such, the crimp tube of this advantageous embodiment provides the optical fibers to the splice components in an aligned and properly spaced manner for alignment and optical interconnection with respective optical fiber stubs. By facilitating the alignment and spacing of the plurality of optical fibers, the multifiber connector including the crimp tube of this aspect of the present invention can be mounted upon a plurality of optical fibers, thereby obviating the conventional practice of separately connectorizing each optical fiber and permitting a plurality of optical fibers to be connectorized in a more efficient and less time consuming manner. In addition, since the multifiber connector including the crimp tube of this embodiment of the present invention appropriately aligns the plurality of optical fibers without requiring the optical fibers to be spaced widely apart, the fiber optic connector of this embodiment of the present invention can include conventional housings and shrouds, thereby facilitating connection of the multifiber connector of this advantageous embodiment with conventional fiber optic hardware, such as connector sleeves, terminals and the like.

According to one embodiment of the multifiber connector, the splice components are adapted to align and operably interconnect end portions of the plurality of optical fiber stubs and the plurality of optical fibers in a splice plane. As such, the passageway defined by the crimp tube of this embodiment preferably defines a major axis in lateral cross-section that extends laterally in a direction parallel to and, more preferably, coplanar with the splice plane such that the optical fibers can be appropriately aligned with respect to the splice plane. Additionally, the passageway defined by the crimp tube is preferably sized such that the major axis is at least twice as long as an orthogonal minor axis such that the crimp tube aligns the optical fibers in a side-by-side relationship along the major axis.

The crimp tube of one advantageous embodiment includes at least one projection, typically having a curved shape in lateral cross-section, that extends into the passageway for securing the optical fibers therein. According to one embodiment, each projection is formed by an elongate rib extending lengthwise through at least a portion of the passageway. In addition, the crimp tube of one advantageous embodiment includes a pair of aligned projections extending into a medial portion of the passageway from opposite sides thereof.

Although the inwardly extending projections facilitate the secure attachment of the crimp tube to the optical fibers, the crimp tube need not include inwardly extending projections but can, instead, have an elliptical shape in lateral cross-section in order to receive the plurality of optical fibers in a lateral side-by-side relationship. In addition, the outer surface of the crimp tube of this embodiment generally has a similar elliptical shape in lateral cross-section.

In order to insure that the end portions of the optical fiber stubs and the field fibers are aligned in the splice plane, the fiber optic connector can include a ferrule holder defining a lengthwise extending passageway for receiving the splice components and at least an end portion of the multifiber ferrule. According to one advantageous embodiment, both the multifiber ferrule and the ferrule holder can include at least two alignment features. For example, the multifiber ferrule can include as at least two lengthwise extending channels, while the ferrule holder can include at least two lengthwise extending ribs which extend into the passageway for engaging corresponding channels of the multifiber ferrule. Since the splice plane defined by the splice components is preferably disposed in a predetermined positional relationship to the alignment features of the ferrule holder, the engagement of the alignment features of the ferrule holder and the multifiber ferrule also aligns the end portions of the optical fiber stubs and the field fibers within the splice plane.

According to another advantageous aspect of the present invention, a fiber optic connector is provided that is adapted for field installation and which includes a ferrule, mechanical splice components, a ferrule holder, an associated cam member for actuating the mechanical splice components and means for controlling the position of the cam member relative to the mechanical splice components such that the cam member can be precisely moved from a first unactuated position to a second actuated position. As such, the fiber optic connector of this advantageous embodiment can be mechanically spliced to a plurality of optical fibers in a reliable manner so as to facilitate the field installation of a multifiber connector.

According to this embodiment, the ferrule holder defines at least one window through which a portion of the mechanical splice components, such as the keel, is exposed. By appropriately mounting the cam member upon the ferrule holder, the cam member will engage the exposed portion of the mechanical splice components as the cam member is moved from the first unactuated position to the second actuated position. More particularly, the cam member is adapted to actuate the splice components in order to mechanically splice the optical fiber stubs held by the ferrule and the optical fibers as the cam member is rotated relative to the ferrule holder from a first unactuated position to a second actuated position.

According to this aspect of the present invention, the cam member includes an inwardly extending projection. Correspondingly, the outer surface of the ferrule holder defines a groove for receiving the inwardly extending projection of the cam member and for guiding the cam member as the cam member is mounted on the ferrule holder and is thereafter rotated relative to the ferrule holder from the first unactuated position to the second actuated position. According to one advantageous embodiment, the groove defined by the outer surface of the ferrule holder includes a first section that extends lengthwise along a portion of the ferrule holder from one end of the ferrule holder to a medial portion of the ferrule holder. In addition, the groove defined by the outer surface of the ferrule holder of this embodiment also includes a second section that extends circumferentially about a portion of the ferrule holder and which intersects the first section of the groove in the medial portion of the ferrule holder.

Preferably, the first and second sections of the groove are defined by the outer surface of the ferrule holder of this advantageous embodiment such that the cam member is in the first unactuated position as the cam member is mounted upon the ferrule holder and the inwardly extending projection of the cam member moves through the first section of the groove. In addition, the first and second sections of the groove are also preferably defined by the outer surface of the ferrule holder of this embodiment such that the cam member moves to the second actuated position as the cam member is rotated relative to the ferrule holder and the inwardly extending projection of the cam member moves through the second section of the groove.

Advantageously, the cam member of one embodiment defines a lengthwise extending passageway having an enlarged portion and a camming portion. As such, the exposed portion of the mechanical splice is preferably disposed within the enlarged portion of the passageway of the cam member as the inwardly extending projection of the cam member moves through the first section of the groove. As a result, the splice components are not actuated as the cam member is mounted upon the ferrule holder. However, the exposed portion of the mechanical splice components is thereafter preferably moved along the camming portion of the passageway of the cam member as the inwardly extending projection of the cam member moves through the second section of the groove. As a result, the splice components are actuated so as to mechanically splice the optical fiber stubs and the optical fibers.

Accordingly, the fiber optic connector of this aspect of the present invention facilitates the field installation of the fiber optic connector upon one or more optical fibers. The fiber optic connector of this advantageous embodiment including the inwardly extending projection of the cam member and the generally L-shaped groove of the ferrule holder also insures that the mechanical splice components are fully actuated following assembly so as to securely engage end portions of the optical fiber stubs and the optical fibers. In addition, the fiber optic connector of this embodiment prevents the cam member from being removed from the ferrule holder without first moving the cam member to an unactuated position, thereby preventing damage to the components of the fiber optic connector which could occur if the cam member were forcibly removed from the ferrule holder while the splice components were actuated.

BRIEF DESCRIPTION OF THE DRAWINGS

FIG. 1 is a perspective view of the fiber optic connector of one embodiment of the present invention.

FIG. 2 is a cross-sectional view of the fiber optic connector of FIG. 1 taken along line 2—2.

FIG. 3 is an exploded perspective view of the fiber optic connector of FIG. 1.

FIG. 4 is an exploded perspective view of the mechanical splice components of the fiber optic connector of FIG. 1.

FIG. 5 is a fragmentary perspective view of a portion of the front face of the fiber optic connector of FIG. 1 which illustrates the first end of the multifiber ferrule.

FIG. 6 is a perspective view of a crimp tube according to one embodiment of the present invention.

FIG. 7 is an end view of the crimp tube of FIG. 6 taken from the flared end of the crimp tube.

FIG. 8 is a perspective view of a crimp tube according to another embodiment of the present invention.

FIG. 9 is an end view of the crimp tube of FIG. 8.

FIGS. 10 and 10A are fragmentary perspective views of a ferrule holder of the fiber optic connector of one advantageous embodiment of the present invention which depict the generally L-shaped groove defined by the outer surface of the ferrule holder and the keel of the splice components extending through a window defined by the ferrule holder, respectively.

FIGS. 11A–11C are sequential perspective views illustrating the mounting of a cam member upon a ferrule holder according to one advantageous embodiment of the present invention in which the retainer and the spring are omitted for purposes of clarity.

FIGS. 12A–12C are sequential cross-sectional views taken along lines 12A—12A, 12B—12B and 12C—12C of FIGS. 11A–11C, respectively.

FIG. 13 is an end view of the ferrule holder of one advantageous embodiment of the present invention.

FIG. 14 is a cross-sectional view of a cam member of one advantageous embodiment of the present invention taken in a lengthwise extending direction.

DETAILED DESCRIPTION OF THE PREFERRED EMBODIMENTS

Figures 10A, 11A, 11B:
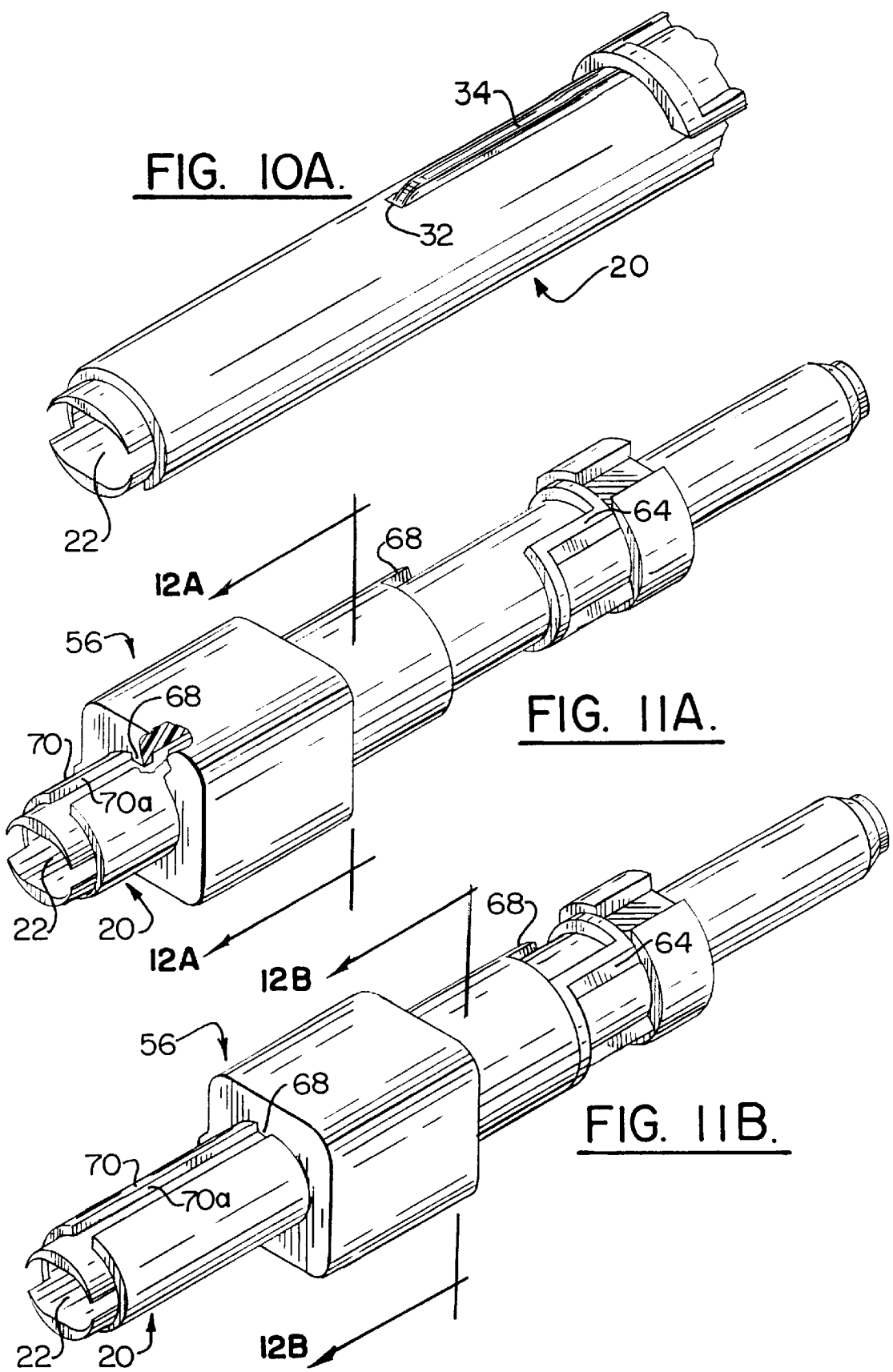

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, the multifiber fiber optic connector 10 according to one advantageous embodiment of the present invention is illustrated. As shown in cross-section in FIG. 2 and, more clearly, by the exploded view of FIG. 3, the multifiber connector includes a multifiber ferrule 12. While the ferrule can be formed of a variety of materials, the ferrule is typically formed of a polymer. Alternatively, the ferrule can be formed of ceramic or glass. Although not necessary for the practice of the present invention, the outer surface of the ferrule typically defines at least two lengthwise extending alignment features, such as a pair of alignment channels 14, for appropriately aligning the ferrule with respect to a connector sleeve or the like.

A number of optical fiber stubs extend through and are secured within the multifiber ferrule 12. Depending upon the eventual application of the multifiber connector 10 and the type of optical fibers upon which the connector will be mounted, the optical fiber stubs can be either multi-mode or single mode optical fiber stubs. In any event, the multifiber ferrule defines a plurality of passageways 16 extending or opening through a first end of the ferrule. Although the multifiber ferrule of the illustrated embodiment includes four passageways as shown most clearly by the fragmentary perspective view of FIG. 5, the multifiber ferrule can be adapted to receive any number of optical fiber stubs and can therefore include any number of passageways opening through the first end, such as 2, 4, 8 or 12 passageways. The multifiber ferrule also includes at least one opening 18 which extends or opens through a second end of the multifiber ferrule, opposite the first end, and which is in communication with each of the passageways 16 opening through the first end of the ferrule, as shown in cross-section in FIG. 2. While the multifiber ferrule could include a plurality of individual passageways extending lengthwise through the entire ferrule for receiving respective optical fiber stubs, the multifiber ferrule typically includes a single opening which flares outwardly in a direction toward the second end of the ferrule such that all of the optical fiber stubs extend through the same opening in the second end of ferrule prior to being inserted into a respective passageway in the first end of the ferrule.

The optical fiber stubs are preferably secured within the multifiber ferrule 12 and, more particularly, within the respective passageways defined by the first end of the ferrule by means of an epoxy or other adhesive. Thereafter, the first end of the multifiber ferrule, including the end portions of the optical fiber stubs that are exposed via the passageways opening through the first end of the ferrule, is precision polished. Although the fiber optic connector 10 of the present invention is particularly well-suited for field installation, the optical fiber stubs are preferably secured within the multifiber ferrule and the first end of the multifiber ferrule is preferably polished in the factory. In contrast to the ends of the optical fiber stubs which extend through the first end of the multifiber ferrule and which are precision polished in the factory, the other ends of the optical fiber stubs which extend through the second end of the ferrule have typically been precision cleaved in order to facilitate subsequent splicing to respective optical fibers.

While the optical fiber stubs are typically secured within the ferrule in the factory as noted above, the remainder of the fiber optic connector 10 of the present invention is typically assembled in the field as the connector is mounted upon end portions of the plurality of optical fibers (hereinafter referred to as "field fibers"). In this regard, the multifiber connector preferably includes a ferrule holder 20 defining a lengthwise extending passageway 22 for at least partially receiving the ferrule 12. As shown in FIG. 2, for example, the second end of the ferrule is typically disposed with one end of the passageway defined by the ferrule holder.

The multifiber connector 10 of the present invention also preferably includes splice components 24, such as mechanical splice components, disposed within the ferrule holder 20. The mechanical splice components of one embodiment are formed of a thermoplastic material, such as ULTEM® polyetherimide resin available from General Electric Company. However, the mechanical splice components can be formed of other materials, if so desired.

As illustrated in FIG. 4, the mechanical splice components 24 of one advantageous embodiment are formed of first and second splice portions or splice halves 24a,24b which are urged together as described below to securely engage end portions of the optical fiber stubs and the field fibers. While the contact surface of the first portion of the splice components which faces the second portion of the splice components is shown to be smooth or planar, the contact surface of the second portion of the splice components which faces the first portion of the splice components defines a plurality of lengthwise extending grooves 26, such as V-shaped grooves. For splice components which define V-shaped grooves, the V-shaped grooves typically define an interior angle of 60°. However, the mechanical splice components can define grooves having other shapes or V-shaped grooves defining other interior angles without departing from the spirit and scope of the present invention.

Once assembled, the ferrule holder 20 secures the mechanical splice components 24 within the lengthwise extending passageway 22 such that the insertion of the second end of the multifiber ferrule 12 into the passageway correspondingly inserts end portions of the optical fiber stubs that extend beyond the second end of the multifiber ferrule into respective grooves 26 defined by the splice components. In this regard, the end of the ferrule holder that receives the ferrule preferably includes at least two alignment features, such as a pair of inwardly projecting ribs 27, to engage the alignment channels 14 of the multifiber ferrule and to rotationally position the ferrule within the ferrule holder. See, for example, FIG. 13. Since the inwardly projecting ribs of the ferrule holder are disposed in a predetermined positional relationship to the splice components, the engagement of the ribs by the alignment channels of the ferrule insures that the end portions of the optical fiber stubs that extend beyond the second end of the multifiber ferrule are aligned with the splice plane and are inserted into respective grooves defined by the splice components.

As described below, end portions of the field fibers can also be inserted into respective grooves 26 from the opposite end of the mechanical splice components 24 so as to be aligned with and optically connected with respective optical fiber stubs. In order to facilitate the optical connection of the optical fiber stubs and the field fibers, a medial portion of each groove defined by the second portion of the splice components can be filled with index matching gel prior to insertion of the field fibers therein. Further, the second portion of the splice components can define one or more laterally extending vents 28 to restrict the index matching gel to the medial portion of the grooves and to limit or prevent migration of the index matching gel to the ends of the splice components. As shown in FIG. 4, the second portion of the splice components can also define flared lead-in portions 30 adjacent each of the opposed ends of the splice components for facilitating the insertion of the end portions of the optical fiber stubs and the field fibers into the respective grooves.

As best illustrated by FIGS. 2 and 10A, the medial portion of the ferrule holder 20 preferably defines a window 32. Correspondingly, the mechanical splice components 24 and, most commonly, the second portion 24b of the splice components, preferably includes a keel 34. As such, the splice components can be disposed within the passageway 22 defined by the ferrule holder such that the keel is engaged within the window defined by the ferrule holder and is exposed through the window for facilitating actuation of the splice components as described hereinbelow.

Once the splice components 24 and the ferrule holder 20 have been assembled such that the optical fiber stubs extending through the second end of the multifiber ferrule 12 are disposed within respective grooves 26 defined by the splice components, field fibers are extended into the passageway 22 defined by the ferrule holder from the end opposite the ferrule. In particular, end portions of the field fibers are preferably inserted into respective grooves defined by the splice components from the end opposite the optical fiber stubs until the end portions of respective pairs of the field fibers and the optical fiber stubs make contact. Since the multifiber connector 10 of the present invention is particularly well-suited for field installation, the field fibers which are inserted into the splice components are typically optical fibers of a fiber optic cable or other group of optical fibers. Prior to insertion into the splice components, however, the field fibers are cleaved as known to those skilled in the art.

Due to the precision with which the splice components 24 are fabricated, the grooves 26 defined by the second portion 24b of the splice components precisely align and optically interconnect respective pairs of the optical fiber stubs and the field fibers in a predefined splice plane, typically defined to be parallel to the contact surfaces of the first and second splice portions and to include the longitudinal axes of the optical fiber stubs and the field fibers. However, the insertion of a plurality of field fibers through the passageway defined by the ferrule holder and into respective grooves defined by the splice components remains a challenging task, particularly in the field.

As such, the multifiber connector 10 of one advantageous embodiment of the present invention preferably includes a crimp tube 36 or lead-in tube through which the end portions of the field fibers are extended prior to insertion into respective grooves 26 defined by the splice components 24. According to this advantageous embodiment, the crimp tube defines a lengthwise extending passageway 38 having a generally oval shape in lateral cross-section for receiving and retaining a plurality of field fibers in a lateral side-by-side relationship. In particular, the generally oval passageway is sized and shaped so as to appropriately align and space the field fibers in such a manner that the end portions of the field fibers which extend through the crimp tube can be readily inserted into the grooves defined by the splice components. In this regard, the generally oval passageway defined by the crimp tube preferably defines a major axis 40 that extends laterally in a direction parallel to and, more preferably, coplanar with the splice plane. Since the splice components are designed to receive end portions of a plurality of closely spaced optical fibers arranged laterally in a side-by-side manner, the passageway defined by the crimp tube also aligns the field fibers in a lateral side-by-side manner with the same or similar spacing to that required by the splice components. In order to permit this lateral alignment, the major axis defined by the passageway of the crimp tube is preferably at least twice as long as the minor axis 42 which extends perpendicular to the major axis as illustrated in FIGS. 7 and 9.

Once the field fibers have been extended through the crimp tube 36 and into the grooves 26 defined by the splice components 24, a portion of the crimp tube that extends beyond the ferrule holder 20 is preferably crimped about the field fibers so as to mechanically couple the crimp tube and the field fibers. Thus, the crimp tube of one embodiment defines a passageway 38 having an elliptical shape in lateral cross-section as shown in FIGS. 6 and 7 so as to uniformly contact or engage the field fibers upon crimping of the crimp tube.

While the multifiber connector 10 of the present invention can be mounted upon a plurality of individual optical fibers, the multifiber connector can also be mounted upon a plurality of optical fibers arranged in a ribbon form. As such, the crimp tube 36 of another embodiment illustrated in FIGS. 8 and 9 defines at least one projection 44 extending into the passageway. As shown, the crimp tube of this embodiment preferably includes a pair of aligned projections extending into a medial portion of the passageway 38 from opposite sides of the crimp tube. While the projections can have a relatively sharp point, such as the apex of a triangularly-shaped projection, the projections of the crimp tube of one advantageous embodiment have a curved or rounded shape in lateral cross-section as shown in FIGS. 8 and 9. In addition, while the projection could extend inwardly into the passageway from one or more discrete points, the crimp tube of the illustrated embodiment includes a pair of projections that are each defined by an elongate rib extending lengthwise through at least a portion of the passageway. While the crimp tube having one or more inwardly extending projections is particularly advantageous for engaging the connecting web of a fiber optic ribbon cable upon crimping the crimp tube so as to secure the ribbon cable within the crimp tube, the crimp tube of this embodiment can also be utilized in conjunction with a plurality of individual optical fibers, if so desired.

During assembly, the crimp tube 36 is preferably inserted into the passageway 22 defined by the ferrule holder 20 from the end opposite the ferrule 12, as shown in cross-section in FIG. 2. While the crimp tube can be mechanically press-fit into the passageway defined by the ferrule holder, the crimp tube is generally secured within the passageway by means of an epoxy, an adhesive or the like. In order to prevent the epoxy or adhesive from wicking into the splice, the epoxy or adhesive is preferably cured while the tip of the fiber optic connector 10, i.e., the end of the fiber optic connector that includes the multifiber ferrule, is in a raised or elevated position.

The crimp tube 36 as well as the end of the passageway 22 defined by the ferrule holder 20 into which the crimp tube is inserted are preferably designed such that a crimp tube can only be inserted into the passageway defined by the ferrule holder in such a manner that the crimp tube and, more particularly, the optical fibers extending through the crimp tube are maintained in a predetermined aligned relationship with respect to the splice components 24. As such, the outer surface of the crimp tube of one advantageous embodiment has an elliptical shape in lateral cross-section. Accordingly, the portion of the passageway adjacent the end of the ferrule holder into which the crimp tube is to be inserted also preferably has a matching elliptical shape in lateral cross-section. See FIG. 10. As such, the crimp tube of this embodiment can be inserted into the passageway defined by the ferrule holder in only two different orientations, both of which maintain the crimp tube and, more particularly, the optical fibers extending through the crimp tube in a predefined aligned relationship with respect to the V-shaped grooves 26 defined by the splice components. By facilitating the alignment and spacing of the plurality of optical fibers, the multifiber connector 10 including the crimp tube of this aspect of the present invention can be mounted upon a plurality of optical fibers, thereby obviating the conventional practice of separately connectorizing each field fiber and permitting a plurality of field fibers to be connectorized in a more efficient and less time consuming manner.

Once the crimp tube 36 has been inserted into the passageway 22 defined by the ferrule holder 20, the field fibers can be extended through the crimp tube and into respective grooves 26 defined by the splice components 24 for alignment with respective optical fiber stubs. In order to facilitate insertion of the field fibers into the passageway defined by the crimp tube, the crimp tube can include a flared portion 46 adjacent one end thereof for receiving the plurality of field fibers. See FIG. 6.

Once the crimp tube 36 has been crimped about the field fibers, the remainder of the multifiber connector 10 is assembled and the splice components 24 are mechanically actuated so as to secure the end portions of the optical fiber stubs and field fibers in the aligned and optically interconnected relationship. In this regard, the multifiber connector generally includes a spring 48 and an annular retainer 50 that are slidably mounted upon ferrule holder 20 for resiliently biasing the ferrule 12 outwardly in a longitudinal direction relative to the inner housing 52 and the shroud 54 as described below.

The multifiber connector 10 also includes a cam member 56 that is thereafter mounted upon the ferrule holder 20. The cam member is designed to engage the portion of the splice components 24 that is exposed through the window 32 defined by the ferrule holder. For example, the cam member of the illustrated embodiment is designed to engage the exposed portion of the keel 34 of the splice components. In addition to engaging the exposed portion of the splice components, the cam member is adapted to actuate the splice components, such as by urging the first and second portions 24a,24b of the splice components toward one another, as the cam member is rotated relative to the ferrule holder from a first unactuated position to a second actuated position. Upon actuation of the splice components, the end portions of the optical fiber stubs and the field fibers are mechanically coupled or spliced.

As shown in cross-section in FIG. 14, the cam member 56 generally defines a lengthwise extending passageway that is sized to receive and therefore be mounted upon the ferrule holder 20. In order to actuate the splice components 24, the passageway defined by the cam member preferably includes an enlarged portion 58 and a camming portion 60. As illustrated by FIG. 14 and as evidenced by the thinner sidewall adjacent the enlarged portion of the cam member, the enlarged portion has a larger radius than the camming portion. Moreover, the passageway is defined by the cam member such that the enlarged portion smoothly transitions into the camming portion and vice-versa.

As shown by FIGS. 11A and 12A, the cam member 56 of this advantageous embodiment is mounted upon the ferrule holder 20 such that the exposed portion of the splice components 24 is disposed within the enlarged portion 58 of the passageway of the cam member. As a result, the cam member can be readily mounted upon the ferrule holder while the splice components remains unactuated. Once the cam member has been mounted upon the ferrule holder, however, the cam member can be rotated relative to the ferrule holder from the first unactuated position to the second actuated position so as to move the exposed portion of the splice components from the enlarged portion to the camming portion 60 of the passageway. See FIGS. 11C and 12C. Due to the smaller dimensions, i.e., smaller radius, of the camming portion, the camming portion operably contacts the exposed portion of the splice components, such as the keel 34, following the rotation of the cam member relative to the ferrule holder. As a result of this contact, the camming portion of the cam member actuates the splice components, such as by urging the first and second portions 24a,24b of the splice components toward one another, so as to mechanically splice the optical fiber stubs and the field fibers therein.

As also shown in FIGS. 11A–11C, the cam member 56 preferably includes a tooth 62 extending outward in a lengthwise direction from one end thereof. In addition, the ferrule holder 20 preferably defines a pair of circumferentially spaced, lengthwise extending ribs 64 which define an arcuate region 66 which typically extends circumferentially about a portion, such as one-quarter, of the ferrule holder. According to this embodiment, the cam member and the ferrule holder are designed such that the outwardly extending tooth is inserted into the arcuate region defined by the ferrule holder as the cam member is mounted upon the ferrule holder in the first unactuated position. See FIGS. 11A and 11B. As the cam member is thereafter rotated relative to the ferrule holder to the second actuated position, the tooth moves circumferentially through the arcuate region. Once the tooth contacts a lengthwise extending rib which defines one edge of the arcuate region, however, further rotation of the cam member relative to the ferrule holder is prevented. See FIG. 11C. As a result, the cam member and ferrule holder of this embodiment cooperate to halt the relative rotation of the cam member and the ferrule holder once the cam member is in the second actuated position.

As also shown in FIGS. 11A–11C and 14, the cam member 56 of one advantageous embodiment of the present invention also includes an inwardly extending projection 68. While the inwardly extending projection is adjacent one end of the cam member in the illustrated embodiment, the inwardly extending projection can be positioned at other points along the lengthwise extending passageway, if so desired. As shown in FIG. 10, the outer surface of the ferrule holder 20 of this advantageous embodiment also preferably defines a groove 70 for receiving the inwardly extending projection. By confining the inwardly extending projection within the groove, the ferrule holder of this advantageous embodiment can guide the cam member as the cam member is initially mounted upon the ferrule holder, i.e., slid lengthwise relative to the ferrule holders and as the cam member is subsequently rotated relative to the ferrule holder from the first unactuated position to the second actuated position.

In the illustrated embodiment, the groove 70 defined by the ferrule holder 20 is generally L-shaped. As such, the groove includes a first section 70a that extends lengthwise along a portion of the ferrule holder from one end of the ferrule holder to a medial portion of said ferrule holder. In addition, the groove includes a second section 70b that extends circumferentially about a portion, such as about one-quarter, of the ferrule holder. As such, the inwardly extending projection 68 of the cam member 56 is moved through the first section of the groove as the cam member is slid lengthwise relative to the ferrule holder as the cam member is mounted upon the ferrule holder. See FIGS. 11A–11B and 12A–12B. Thereafter, the inwardly extending projection of the cam member is moved through the second section of the groove as the cam member is rotated relative to the ferrule holder. See FIGS. 11C and 12C. Although the first and second sections of the groove of this embodiment are preferably orthogonal, the first and second sections of the groove intersect in the medial portion of the ferrule holder to permit the cam member to be rotated relative to the ferrule holder once the cam member has been fully mounted upon the ferrule holder.

As described above, the cam member 56 is in the first unactuated position as the cam member is mounted upon the ferrule holder 20 by moving the inwardly extending projection 68 through the first section 70a of the groove. As also described above, the cam member transitions from the first unactuated position to the second actuated position as the cam member is rotated relative to the ferrule holder by moving the inwardly extending projection through the second section 70b of the groove. In the embodiment in which the passageway defined by the cam member includes an enlarged portion 58 and a camming portion 60, the cam member and the ferrule holder are preferably designed such that the exposed portion of said mechanical splice components 24 is disposed within the enlarged portion of the passageway of the cam member as the inwardly extending projection of the cam member is moved through the first section of the groove. See FIGS. 12A and 12B. Correspondingly, the cam member and the ferrule holder of this advantageous embodiment are also preferably designed such that the exposed portion of the mechanical splice components is moved along the camming portion of the passageway of the cam member as the inwardly extending projection of the cam member is moved through the second section of the groove. See FIG. 12C. By engaging the exposed portion of the splice components with the camming portion, the splice components are actuated, such as by urging the first and second portions 24a,24b of the splice components toward one another, so as to mechanically splice the optical fiber stubs and the field fibers as described above.

By confining the inwardly extending projection 68 of the cam member 56 to the generally L-shaped groove 70, the fiber optic connector 10 of this advantageous embodiment of the present invention insures that the cam member is fully mounted upon the ferrule holder prior to actuating the splice components by rotating the cam member relative to the ferrule holder, thereby complete or full actuation of the splice components 24. In addition, the fiber optic connector of this advantageous embodiment prevents the cam member from being removed from the ferrule holder 20 without first being moved to an unactuated position by rotating the cam member in the opposite direction relative to the ferrule holder so as to move the inwardly extending projection from the second section 70b of the groove in which the splice components are actuated to the first section 70a of the groove in which the splice components are unactuated. Thus, the fiber optic connector of this advantageous embodiment prevents inadvertent damage to the components of the fiber optic connector which could otherwise possibly be incurred by removing a cam member from the ferrule holder while in the actuated position.

Once the splice components 24 have been actuated, such as by mounting the cam member 56 upon the ferrule holder 20 and thereafter rotating the cam member relative to the ferrule holder, the remaining components of the fiber optic connector 10 are assembled. As shown in FIGS. 2 and 3, the fiber optic connector can include an annular crimp band 72, typically formed of copper, that is mounted upon the end portion of the ferrule holder 20, proximate the cam member. In embodiments in which the optical fibers are associated with strength members, such as the KEVLAR™ strength members of a fiber optic cable, the strength members can be positioned between the crimp band and the ferrule holder such that the strength members can be securely engaged by crimping the crimp band about the ferrule holder as known to those skilled in the art.

The assembled components of the fiber optic connector 10 can then be inserted into an inner housing 52 as shown in FIGS. 1–3. As known to those skilled in the art, the retainer 50 can include a pair of circumferentially extending ribs 74 which engage corresponding windows 76 defined by the inner housing so as to mechanically couple the assembled components and the inner housing. Although the ribs need only extend about a portion of the circumference, the ribs can extend about the entire circumference of the retainer, if so desired. The inner housing is then inserted into a shroud 54. As also known those skilled in the art, the inner housing typically includes a pair of outwardly extending ledges 78 which engage respective windows 80 defined by the shroud so as to slidably engage the inner housing and the shroud. Thereafter, a boot 82 which has been previously mounted upon the field fiber(s) can be inserted into the rear end of the shroud so as to provide strain relief for the field fibers.

Since the advantageous embodiment of the multifiber connector 10 which includes a crimp tube 36 defining a passageway 38 having a generally oval cross-sectional shape appropriately aligns the plurality of optical fibers without requiring the optical fibers to be spaced widely apart, the fiber optic connector of this embodiment can include conventional housings 52 and shrouds 54, such as the housings and shrouds of conventional SC, FC and ST connectors. As a result, the multifiber connector of this advantageous embodiment facilitates connection of the multifiber connector with conventional fiber optic hardware, such as connector sleeves, terminals and the like, thereby further increasing the efficiency with which field fibers can be connectorized and correspondingly decreasing the time and labor required to connectorize a plurality of field fibers.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A fiber optic connector adapted to be mounted upon respective end portions of a plurality of optical fibers, the fiber optic connector comprising:

a multifiber ferrule extending lengthwise between opposed first and second ends for receiving a plurality of optical fiber stubs, said multifiber ferrule defining a plurality of passageways extending through the first end thereof and at least one opening extending through the second end thereof for receiving the plurality of optical fiber stubs;

splice components extending lengthwise from a first end, proximate the second end of said multifiber ferrule, to an opposed second end, said splice components adapted to align and operably interconnect end portions of the plurality of optical fiber stubs and the plurality of optical fibers received through the first and second ends of said splice components, respectively; and a crimp tube, proximate the second end of said splice components, that defines a lengthwise extending passageway, wherein the passageway defined by said crimp tube has a lateral cross-sectional shape that is generally oval for receiving the plurality of optical fibers, wherein said crimp tube is adapted to be crimped about the optical fibers so as to maintain the optical fibers in a lateral side-by-side relationship.

2. A fiber optic connector according to claim 1 wherein the splice components are adapted to align and operably interconnect end portions of the plurality of optical fiber stubs and the plurality of optical fibers in a splice plane, and wherein the passageway defined by said crimp tube defines a major axis in lateral cross-section that extends laterally in a direction parallel to the splice plane.

3. A fiber optic connector according to claim 2 wherein the passageway defined by said crimp tube defines a minor axis in lateral cross-section that is perpendicular to the major axis, and wherein the passageway defined by said crimp tube is sized such that the major axis is at least twice as long as the minor axis.

4. A fiber optic connector according to claim 1 wherein said crimp tube comprises at least one projection extending into the passageway for securing the optical fibers therein.

5. A fiber optic connector according to claim 4 wherein at least one projection comprises an elongate rib extending lengthwise through at least a portion of the passageway.

6. A fiber optic connector according to claim 4 wherein at least one projection has a curved shape in lateral cross-section.

7. A fiber optic connector according to claim 4 wherein at least one projection comprises a pair of aligned projections extending into a medial portion of the passageway from opposite sides thereof.

8. A fiber optic connector according to claim 1 wherein the passageway defined by said crimp tube has an elliptical shape in lateral cross-section.

9. A fiber optic connector according to claim 1 wherein the outer surface of said crimp tube has an elliptical shape in lateral cross-section.

10. A fiber optic connector according to claim 1 wherein the passageway defined by said crimp tube has a flared portion adjacent one end thereof for receiving the plurality of optical fibers.

* * * * *

UNITED STATES PATENT AND TRADEMARK OFFICE
CERTIFICATE OF CORRECTION

PATENT NO. : 6,173,097 B1
DATED : January 9, 2001
INVENTOR(S) : Rodney A. Throckmorton, Mark W. Spriggle and Jeffrey D. Palmer It is certified that error appears in the above-identified patent and that said Letters Patent is hereby corrected as shown below:

<u>Title page,</u>
Item [75], Inventors: after Mark W. Spriggle, Hickory, both of NC (US), delete "Jeffrey D. Palmer, Fort Worth, TX (US)".

Signed and Sealed this

Fifth Day of November, 2002

*Attest:*

*Attesting Officer*

JAMES E. ROGAN
*Director of the United States Patent and Trademark Office*